United States Patent [19]

Podd et al.

[11] Patent Number: 5,685,688
[45] Date of Patent: Nov. 11, 1997

[54] MULTI-STAGE INFLATABLE FLOOR BED FOR CONTAINER OR CONTAINER LINER

[76] Inventors: Victor T. Podd, 255 Beverly Avenue, Montreal, Quebec, Canada, H3P1K8; Victor I. Podd, 2582 NW. 59th St., Boca Raton, Fla. 33496

[21] Appl. No.: 558,612

[22] Filed: Nov. 14, 1995

[51] Int. Cl.$^6$ ........................ B60P 1/00
[52] U.S. Cl. ............ 414/539; 414/467; 414/786; 414/304; 222/386.5; 220/401; 105/367
[58] Field of Search ............ 298/1 B; 414/467, 414/527, 539, 304, 786, 288, 287; 222/282, 386.5, 389; 105/523, 367; 220/401, 403, 470, 400

[56] References Cited

U.S. PATENT DOCUMENTS

| | | | |
|---|---|---|---|
| 2,712,797 | 7/1955 | Woehrle et al. | 105/367 |
| 2,764,950 | 7/1956 | Woehrle et al. | 105/367 |
| 2,931,523 | 4/1960 | Nelligan . | |
| 2,956,839 | 10/1960 | Hermanns | 302/53 |
| 3,139,998 | 7/1964 | Seaman . | |
| 3,941,258 | 3/1976 | Ide | 414/304 |
| 4,213,545 | 7/1980 | Thompson et al. | 222/386.5 |
| 4,453,875 | 6/1984 | Johnson, Sr. | 414/304 |
| 4,471,892 | 9/1984 | Coleman | 222/386.5 |
| 4,854,801 | 8/1989 | Bonerb | 414/291 |
| 5,024,346 | 6/1991 | Roser | 220/401 |
| 5,050,765 | 9/1991 | Roser et al. | 220/401 |
| 5,335,820 | 8/1994 | Christianson | 222/105 |

FOREIGN PATENT DOCUMENTS

| | | | |
|---|---|---|---|
| 538563A | 4/1993 | European Pat. Off. . | |
| 2249783 | 4/1974 | Germany | 414/539 |
| 58-53530 | 3/1983 | Japan . | |
| 742186 | 6/1980 | U.S.S.R. | 414/539 |
| 992260 | 2/1983 | U.S.S.R. | 414/539 |
| 1682249 | 10/1991 | U.S.S.R. | 414/304 |
| 1032637 | 6/1966 | United Kingdom | 414/539 |
| 2237559 | 5/1991 | United Kingdom . | |

OTHER PUBLICATIONS

"Action in the End Zone: A Bigger Covered Hopper", Railway Age Magazine, Jul., 1969, pp. 25–28.

Primary Examiner—Frank E. Werner
Attorney, Agent, or Firm—John C. Smith

[57] ABSTRACT

A cargo flow control system for bulk cargo containers. The system uses an inflatable bag positioned between the floor of the container and the cargo. When the bag is inflated, it slopes downward from the front of the container to the discharge door at the rear of the container. When the slope is greater than the angle at which the bulk cargo naturally flows, the container can be unloaded without using other unloading techniques such as tilting the container. The system can be used with or without a liner. When used with a liner, it can be manufactured as an integral part of the liner, or as a separate unit. The upper surface of the bag is fabricated from one or more rigid panels which may be attached to the inside or outside of the upper surface of the bag. In one embodiment, the rigid panels are separate and operate independently from one another. In a second embodiment, the panels are attached via hinge mechanisms.

18 Claims, 15 Drawing Sheets

MULTI-STAGE INFLATABLE FLOOR BED FOR CONTAINER OR CONTAINER LINER

BACKGROUND OF THE INVENTION

CROSS-REFERENCE TO RELATED APPLICATIONS

This application is related to the commonly owned copending application entitled "MULTI-STAGE INFLATABLE FLOOR BED FOR CONTAINER OR CONTAINER LINER", filed Aug. 26, 1994, bearing U.S. Ser. No. 08/297,308, now U.S. Pat. No. 5,494,394 and naming Victor T. Podd and Victor L Podd, both of the named inventors herein, as joint inventors, the contents of which is specifically incorporated by reference herein in its entirety.

TECHNICAL FIELD

The present invention relates to the unloading of flowable cargo transported in lined or unlined bulk cargo containers. In particular, it relates to devices which unload containers on level surfaces by altering the floor slope angle inside the container.

Background Art

Transportation of containers for bulk commodity products (grains, etc) have been implemented using a variety transport vehicles, such as trucks, railroads, and ships. An important economic factor in the transportation of bulk commodities is the speed and ease with which the commodities are unloaded from the container.

Typical methods of unloading containers are pressure systems such as pumps to provide suction to remove the commodities during unloading. Another popular method is the use of gravity mechanisms. For example, gravity may be used to unload a container by tilting the container such that the bulk commodity flows toward a discharge door at the rear end of the container. Tilt mechanisms can be implemented by placing the container on an independent tilt mechanism or by incorporating the tilt mechanism into the container itself.

The prior art approach of raising the container to allow the bulk commodity to flow out has been effectively used to unload cargo from the container with a minimum amount of labor cost. With this method, there is some additional labor expense of manually removing the residual commodity trapped in the corners. In addition to the labor expense required to remove the residual commodity product from the corners, the economic efficiency of the container and transport vehicle is reduced due to the delay involved with this additional step in the unloading procedure.

More important, the cost of the mechanism required to lift the weight of the container for tilting purposes is high, and also raises safety problems inherent in any machinery of that size and weight. Further, due to its cost this type of unloading device is not always available. In the case where bulk commodity is infrequently delivered, this type of unloading solution may not be available.

Another prior art approach which addresses the foregoing problem is to unload the cargo by having an individual manually control a suction hose, and walk through the container to unload the contents. This solution allows unloading the cargo in locations where tilt mechanisms, either independent or installed on the container, are unavailable. However, it also entails several drawbacks. It is very labor intensive, and due to the weight involved, must be done at a speed which allows an individual to safely unload the container contents. In turn, this increases unloading time and reduces economic efficiency. In addition, to requires that the individual enter the container which exposes products to contamination by the worker, and depending on the cargo, exposes the worker to contamination as well.

A third alternative is to unload the commodity using a vehicle such as a small front loader which can be driven into the container. This method is quicker than the manual method discussed above, but is costly due to the cost of the front loader. The labor costs may also be higher since the front loader operator may be better paid than the manual laborer discussed above. Depending on the commodity, the front loader solution may not be usable for all types of cargo. In addition, the front loader is an expensive item of equipment which may not be available at a given location just as the tilt mechanisms may not be available.

While addressing the various aspects of unloading bulk commodities in container systems, the prior art has typically chosen alternative methods such as the tilt systems or manual systems discussed above. While tilt systems can rapidly unload, they have numerous drawbacks such as high cost, non-universal availability, and safety concerns. On the other hand, manual systems are slower to unload, raise contamination issues, and are less efficient than tilt systems. Front loaders are also less efficient than tilt systems, but retain the aspect of high cost. The prior art has not provided an unloading system which is universally available, does not have the high cost of tilt systems and front loaders, or the economic inefficiency of manual systems, reduces worker exposure to physical injury, reduces worker exposure to contamination by the cargo, and cargo exposure to contamination by the worker.

SUMMARY OF THE INVENTION

The present invention solves the foregoing problems by providing an inflatable bag which acts as a floor bed which is deflated and lies underneath the bulk cargo during shipment. The upper surface of the liner is fabricated from one or more rigid panels which may be attached to the inside or outside of the upper surface of the liner. In one embodiment, the rigid panels are separate and operate independently from one another. In a second embodiment, the panels are attached via hinge mechanisms. During the unloading process, the inflatable floor bed is inflated by air pressure. The inflated floor bed is shaped to provide a floor which slopes downward from the front of the container to the discharge door. The angle of the slope is designed to equal or exceed the free flow rate of the bulk cargo such that the cargo flows out the discharge under gravity pressure in the same manner it would if the container was raised by a tilt mechanism. The inflatable floor bed can be used with containers with or without liners. When used with liners, the inflatable floor bed can be manufactured as an independent unit which is placed under a standard liner, or it can be manufactured as an integral part of the liner or can be placed inside the liner.

DESCRIPTION OF THE PREFERRED EMBODIMENT

Figure 1:
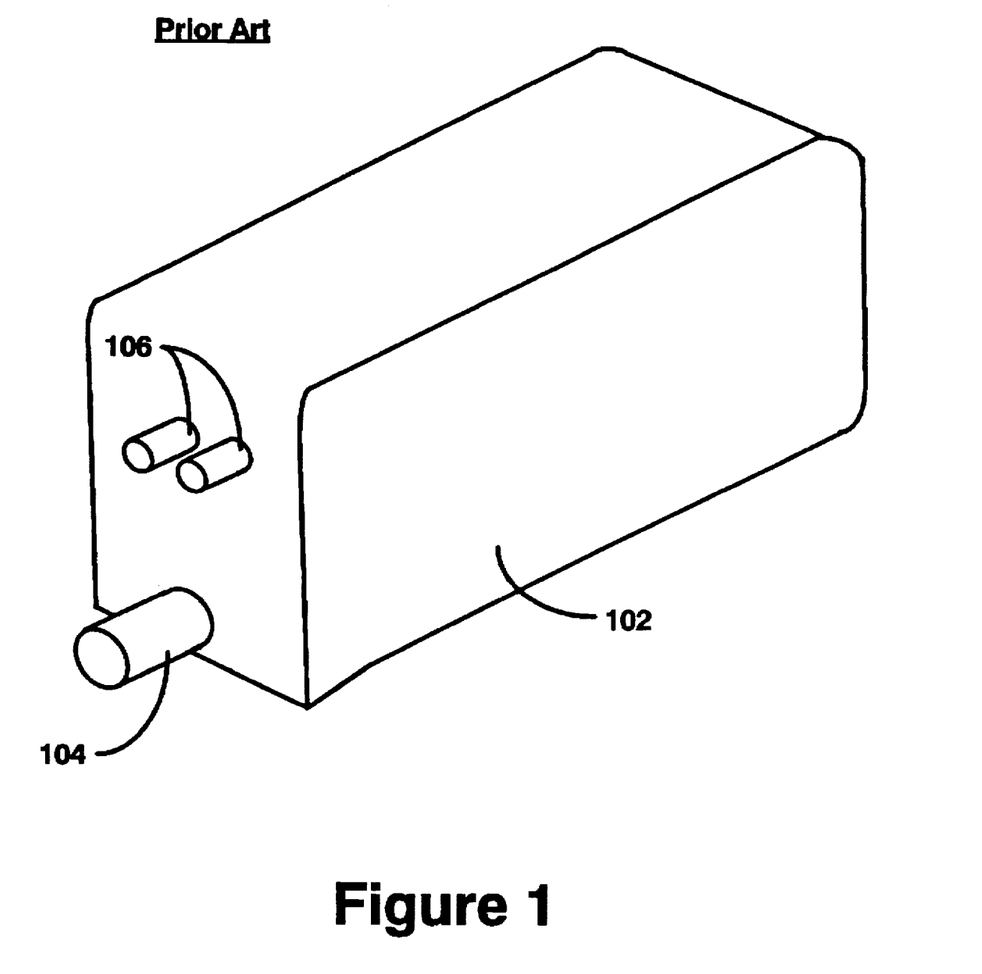
FIG. 1 is a diagram of a prior art liner.

Referring to FIG. 1, this figure shows a prior art liner 102 which can be used in conjunction with the invention. Tubes 106 provide access to load/vent liner 102. Discharge tube 104 is located to fit through discharge door 204 of bulkhead 202 (shown in FIG. 2).

Figure 2:
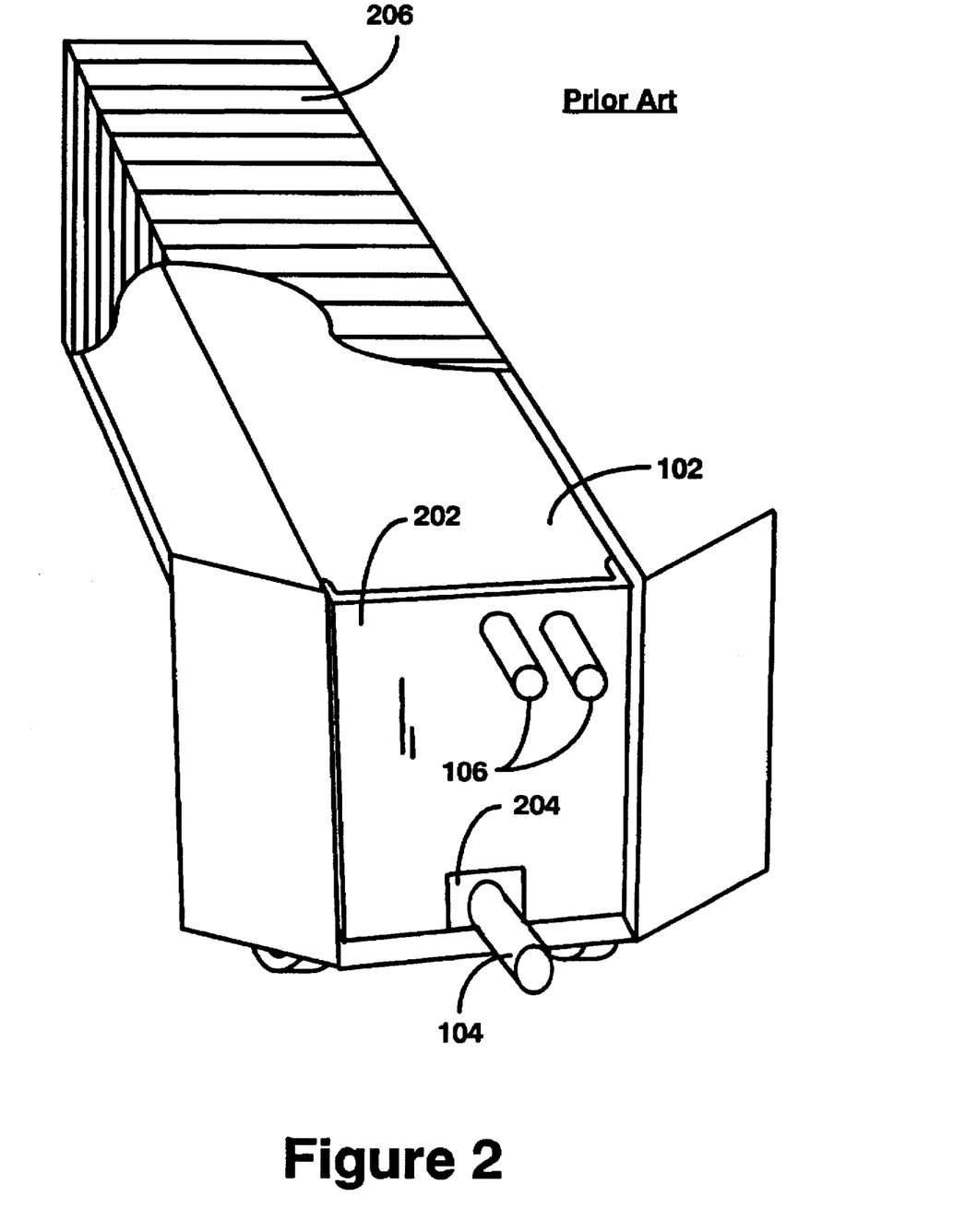
FIG. 2 is a diagram of a prior art liner installed in a container with a bulkhead.

FIG. 2 shows a prior art container 206 which has liner 102 installed. Bulkhead 202 has discharge door 204 located at its base to allow discharge of cargo from container 206 as it is being tilted. During loading, discharge tube 104 is sealed and load/vent holes 106 located near the top of the liner 102 are used to provide access for loading the cargo.

Figure 3:
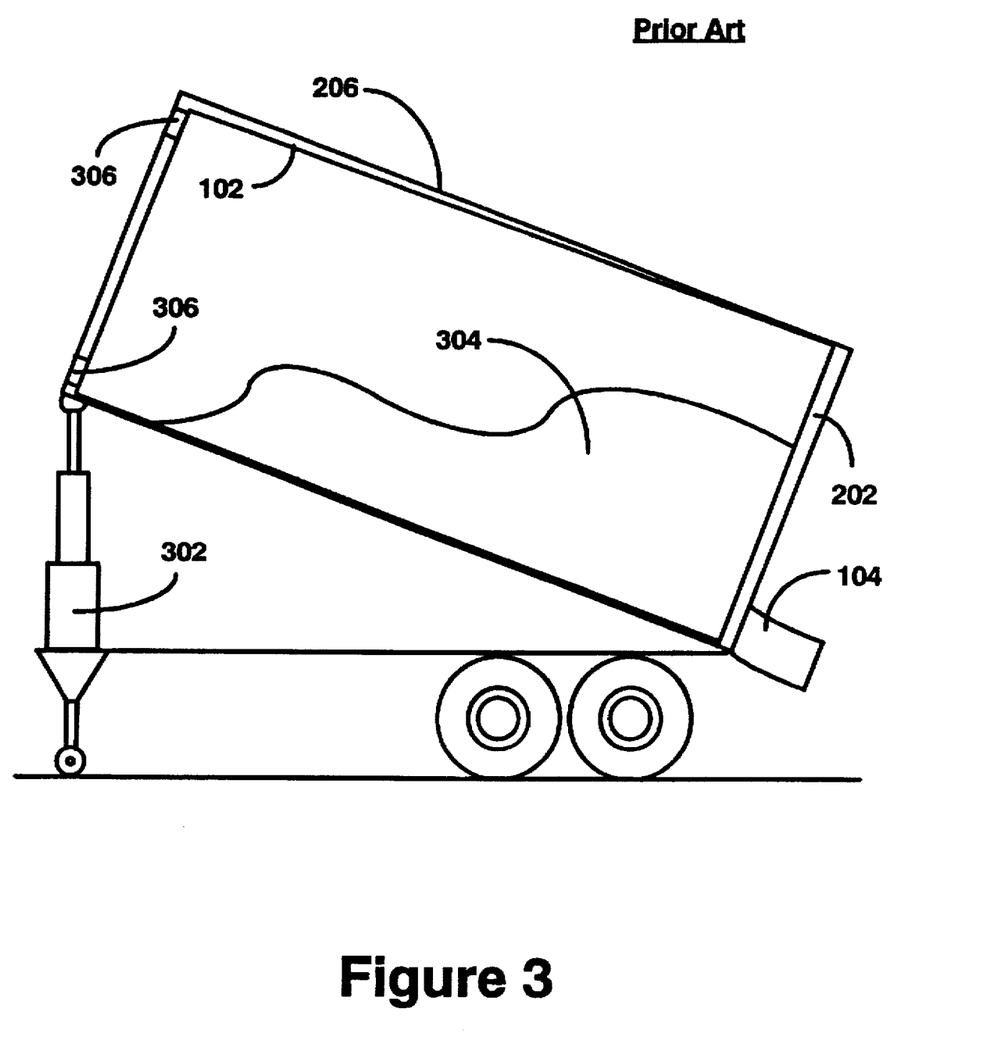
FIG. 3 is a diagram of a prior art container with an integral tilt mechanism.

FIG. 3 illustrates a prior art method of using the devices of FIGS. 1 and 2 to unload bulk cargo 304 with a tilt mechanism 302. Tilt mechanism 302 can be used with or without liners 102. A container 206 is driven onto a tilt mechanism (not shown) or tilted in integral tilt mechanism 302. Liner 102 is secured to container 206 by wall attachments 306. Raising container 206 allows gravity to unload bulk cargo 304 through discharge tube 104. Due to the substantial weight of a typical container 206, tilt mechanisms 302 are expensive devices. Independent tilt mechanisms are even costlier. As a result, they are not available at all locations which service containers 206. In the event a particular location does not ordinarily handle bulk commodities, an infrequent delivery of such goods will often require another unloading method. Alternative methods will either be the slower and less efficient use of a front loader or the even more inefficient use of a manual vacuum system.

Figure 4:
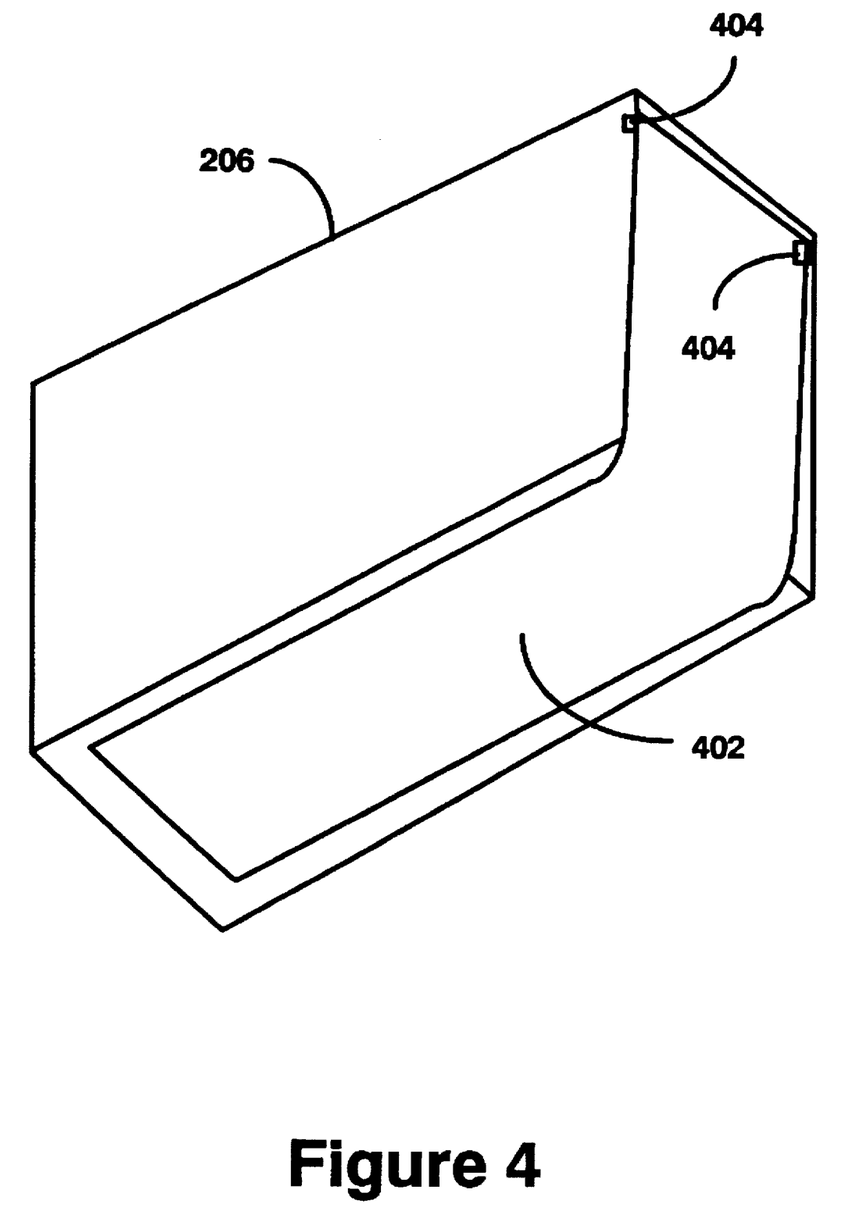
FIG. 4 is a diagram of an embodiment showing an installation of a closed liner with the inflatable floor bed in a container.

FIG. 4 is a cutaway view showing a method of installing a liner 402 with an inflatable floor bed 504, 506, 508 (shown below in FIG. 5). The liner 402 is attached to the inside of container 206 at attachments 404. Those skilled in the art will recognize that any number of well known methods may be employed to attach a liner to a container. Therefore, the attachment methods shown herein are intended for illustration only.

Figure 5:
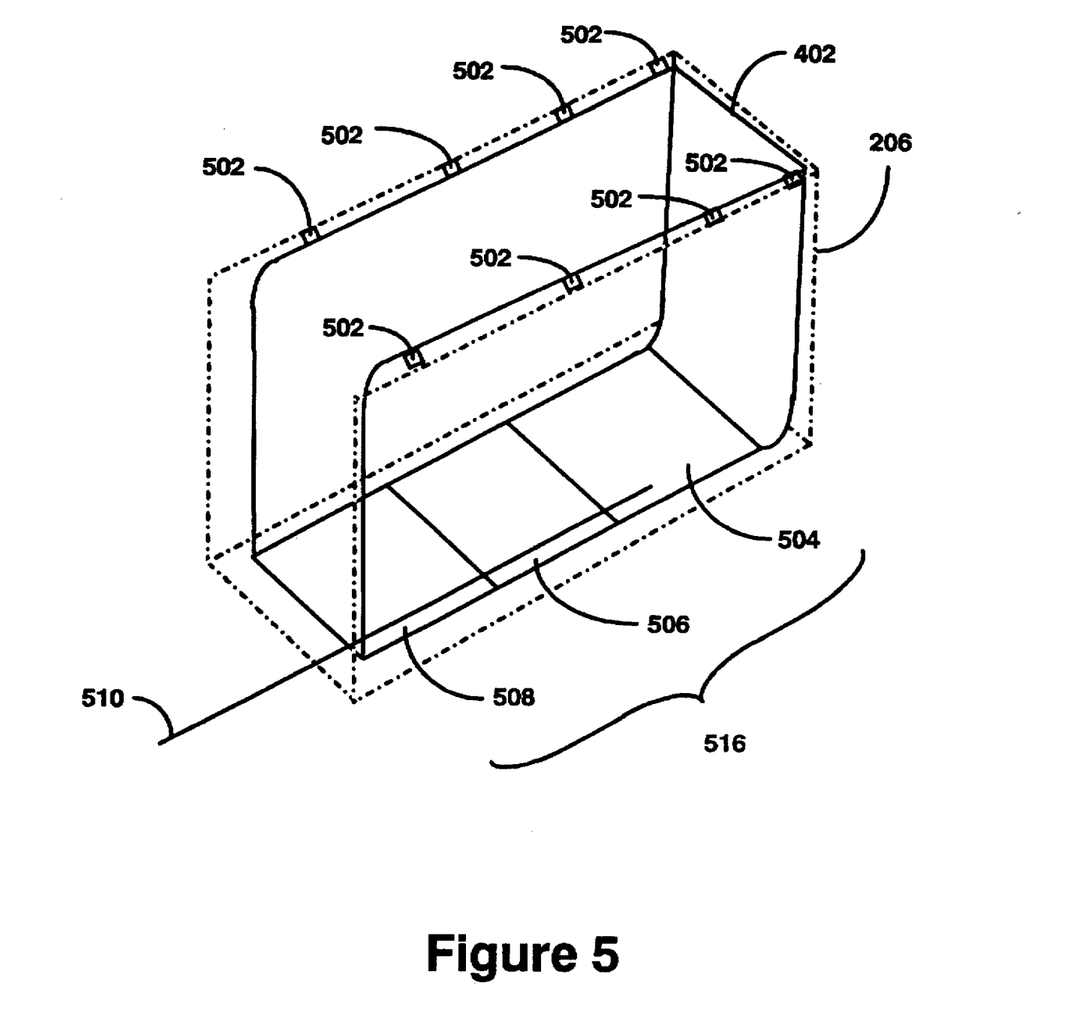
FIG. 5 is a diagram of an expanded liner prior to loading with the inflatable floor bed in the deflated state.

FIG. 5 shows liner 402 in the open position prior to loading. Container 206 is shown in outline form to illustrate the position of liner 402 in container 206. In this figure, liner 402 is shown attached to container 206 by attachments 502. As discussed in regard to FIG. 4, any number of well known methods may be used to attach liner 402 to container 206. Inflatable floor bed 516 is shown in this embodiment as being formed by three compartments 504, 506, 508. While the preferred embodiment envisions three compartments 504, 506, 508 as suitable, there is no requirement that a particular number of compartments 504, 506, 508 be used. The invention may be implemented with as little as a single compartment or as many as may be conveniently manufactured.

While the preferred embodiment envisions each of the compartments 504, 506, 508 being pressurized by a single dedicated air pressure line simultaneously, those skilled in the art will recognize that each separate compartment 504, 506, 508 can have an independent fill line 510 associated with it to allow each compartment 504, 506, 508 to be independently controlled. The advantage of a single line with multiple perforations is that costs are reduced because component counts are reduced and a simpler design is easier and less expensive to construct. In addition, a single line provides for better equalization of air pressure in the chambers.

As can be seen, the inflatable floor bed 516 lies substantially flat on the floor of the liner when deflated. In the preferred embodiment, inflatable floor bed 516 is constructed of the same flexible material as liner 402. Typical materials used for commercially available liners are polyethylene or polypropylene having a thickness of approximately 6 mils. Materials may be woven, blown film, extruded, or coated fabric. Further, the choice of material and the thickness selected can vary based on many factors, such as the type and weight of the cargo. When deflated, the inflatable floor bed 516 consumes a minimum of space and will be pressed substantially flat by the weight of the cargo 304 which rests on top of it.

Figure 6:
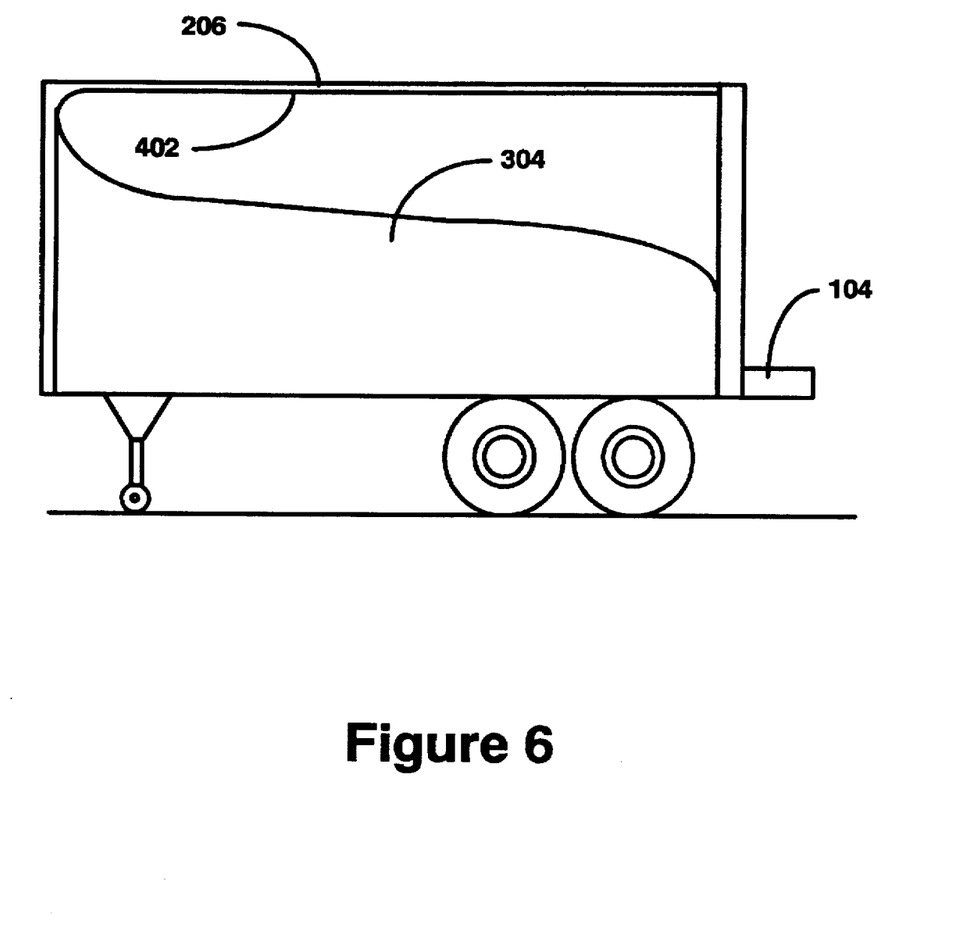
FIG. 6 is a side cutaway view of a lined loaded container with a deflated inflatable floor bed.

FIG. 6 is a side cutaway view illustrating a container 206 with a liner 402 when loaded. For ease of illustration, the inflatable floor bed 516 is not shown since it would be pressed substantially flat against the floor of container 206. In this configuration, if discharge tube 104 is opened to unload the cargo 304, the cargo will flow out until the angle of the surface of cargo 304 falls below the flow angle of that particular cargo. The flow angle of cargo will vary based on the nature of the bulk commodity. Once commodity flow has stopped, prior art unloading methods would require the use of additional equipment, such as tilting devices, to resume the unloading procedure.

Figure 7:
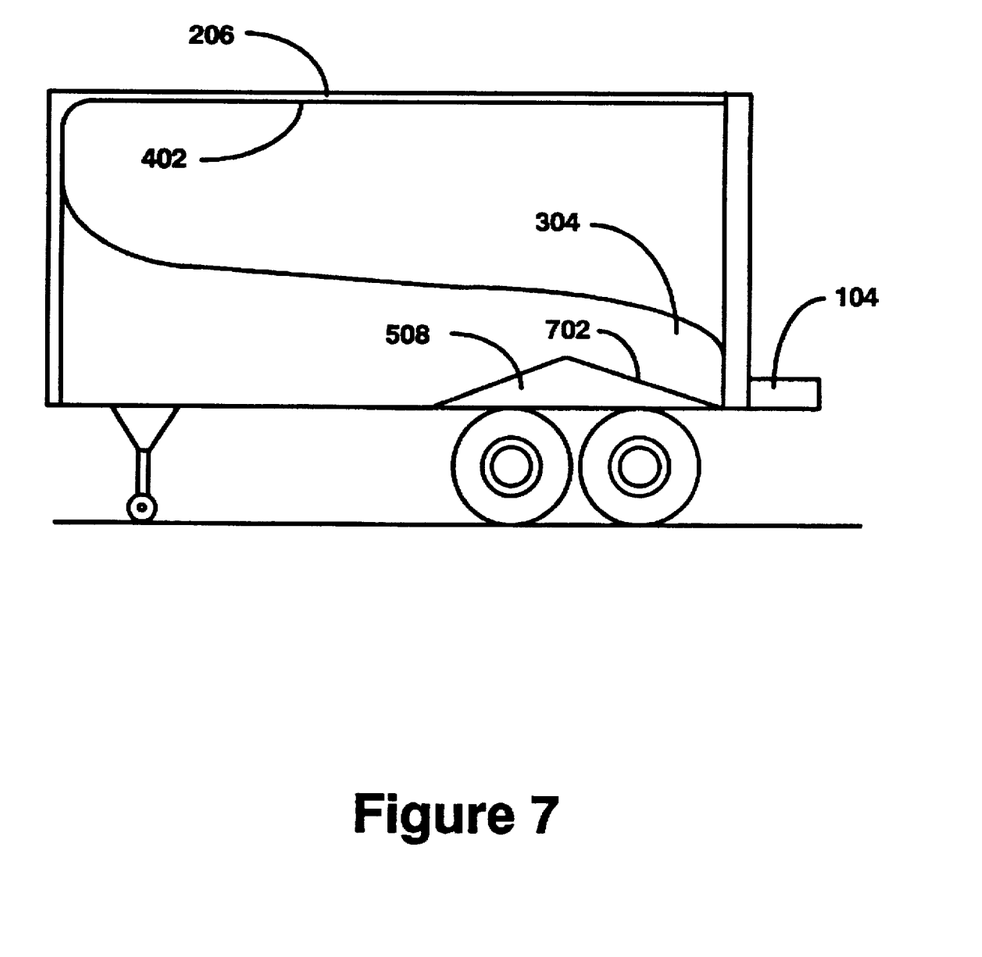
FIG. 7 is a side cutaway view of a lined loaded container with the inflatable floor bed in the first stage of inflation during the unloading process.

FIG. 7 shows a side cutaway view of inflatable floor bed 516 in the first stage of inflation. As commodity flow begins to slow down due to a decrease in the flow angle of the cargo, compartment 508 can be inflated by pump 1116 (shown in FIG. 11) via fill line 510. When compartment 508 is inflated, the angle of upper surface 702 exceeds the flow angle of the cargo 304. This allows the cargo above surface 702 to continue unloading.

Figure 8:
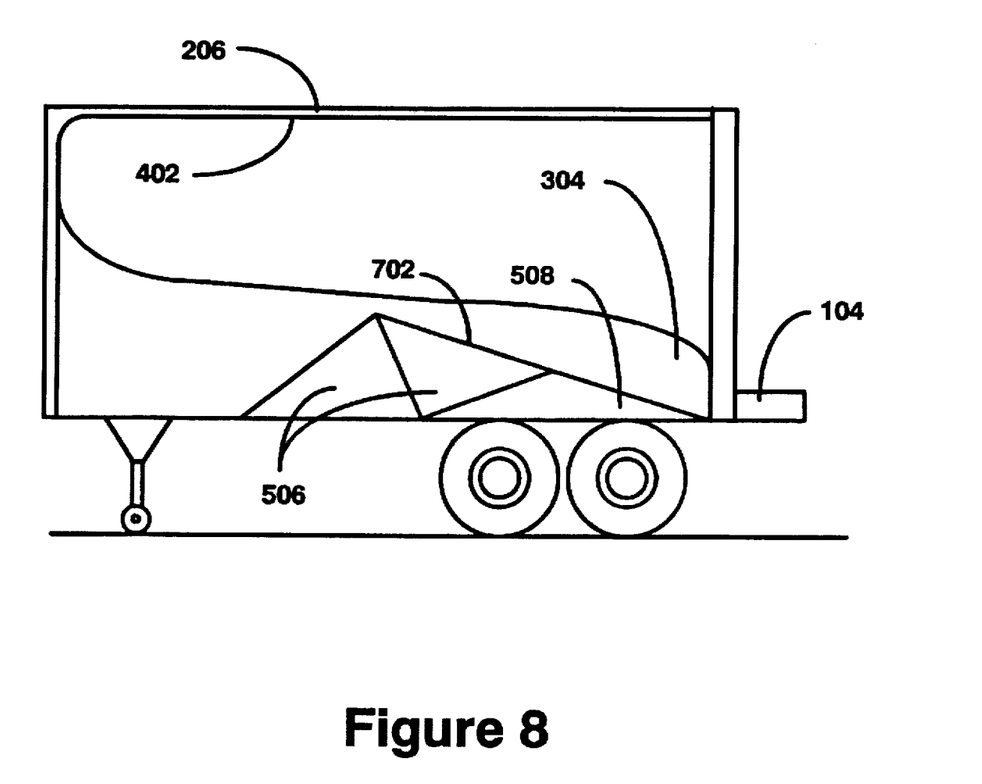
FIG. 8 is a side cutaway view of a lined loaded container with the inflatable floor bed in the second stage of inflation during the unloading process.

FIG. 8 illustrates the second stage of inflation. As the amount of cargo 304 above compartment 508 decreases, the next compartment 506 is inflated by fill line 510. This raises the cargo 304 above compartment 506 while upper surface 702 is extended. By so doing, an additional portion of cargo 304 is raised onto the upper surface 702 which exceeds the flow angle of the cargo 304. Due to this, the cargo above compartment 506 begins to flow downward towards discharge tube 104. In the preferred embodiment, compartment 506 is envisioned as being formed by two separate trihedral sub-compartments. Those skilled in the art will recognize that compartments 504, 506, 508 could also be designed in a number of convenient configurations, including a compartment 504, 506, 508 with no sub-compartments.

Figure 9:
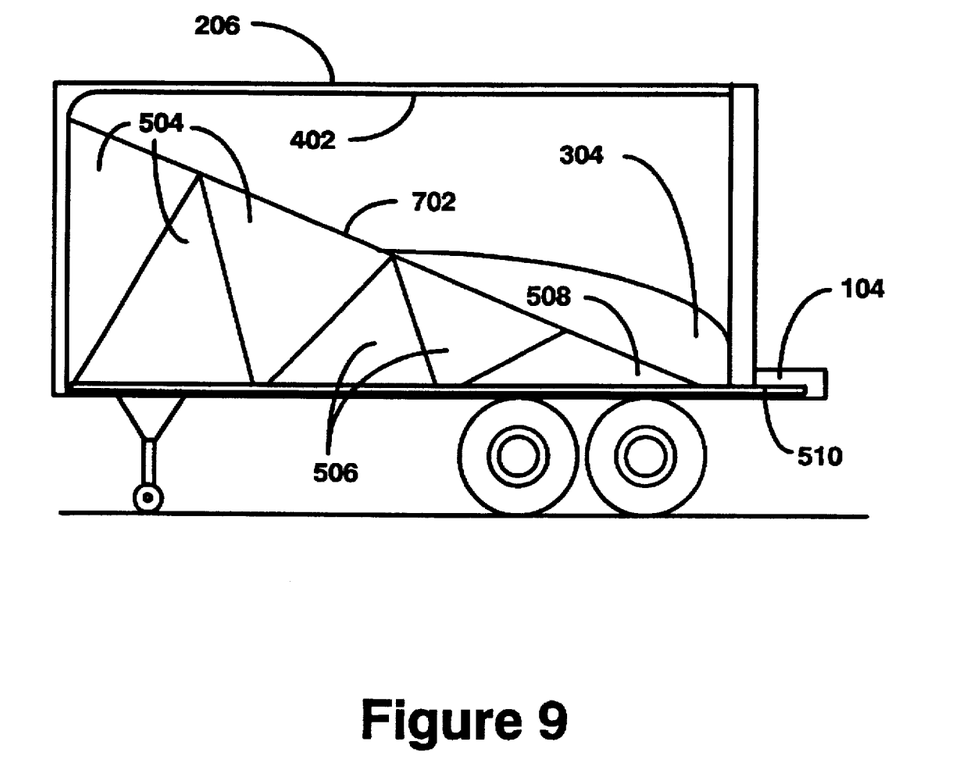
FIG. 9 is a side cutaway view of a lined loaded container with the inflatable floor bed in the final stage of inflation during the unloading process.

FIG. 9 illustrates the final stage of inflation. As the amount of cargo 304 above compartments 506 and 508 decreases, the next compartment 504 is inflated by fill line 510. This raises the cargo 304 above compartment 504 while upper surface 702 is extended. By so doing, the remaining portion of cargo 304 is raised onto the upper surface 702 which exceeds the flow angle of the cargo 304. Due to this, the cargo above compartment 504 begins to flow downward towards discharge tube 104.

In difficult flowing materials, semi-rigid support panels of plywood, cardboard, or plastic may be added or laminated to the angled surface. By so doing, the slope angle will be more consistent throughout the length of the angled surface and cargo will therefore be less apt to slow at points where the slope angle decreases.

In the preferred embodiment, the cargo 304 is unloaded first from the end of the inflatable floor bed 516 nearest discharge tube 104. By so doing, the effect on cargo flow is maximized by enhancing the flow rate through discharge tube 104 and decreasing the remaining weight to be lifted. By compartmentalizing the inflation procedure, smaller amounts of weight need to be lifted at any one time, allowing lower air pressure, and thinner inflatable floor bed 516 material. However, those skilled in the art will recognize that inflatable floor bed 516 can be constructed with a single compartment.

Figure 10:
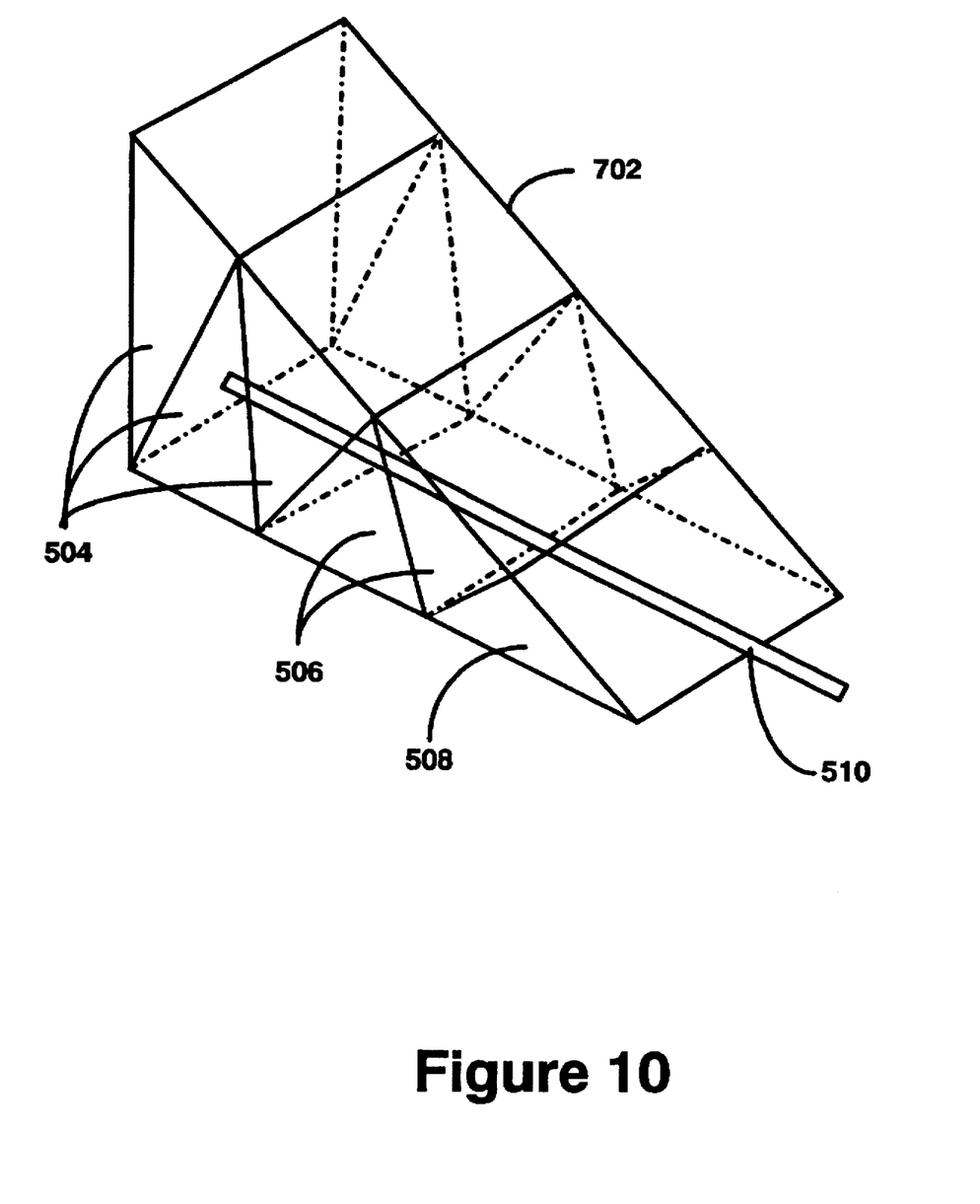
FIG. 10 is a diagram showing the inflation lines in an inflatable floor bed used in the preferred embodiment.

FIG. 10 illustrates the inflatable floor bed 516 as an independent unit. While inflatable floor bed 516 has been shown heretofore as an integral part of liner 402, inflatable floor bed 516 can also be implemented as an independent unit for use in linerless containers 206, or as an independent unit for use with an independent liner 102. In this embodiment, compartments 504, 506, 508 are formed from sub-compartments having a trihedral shape.

Figure 11:
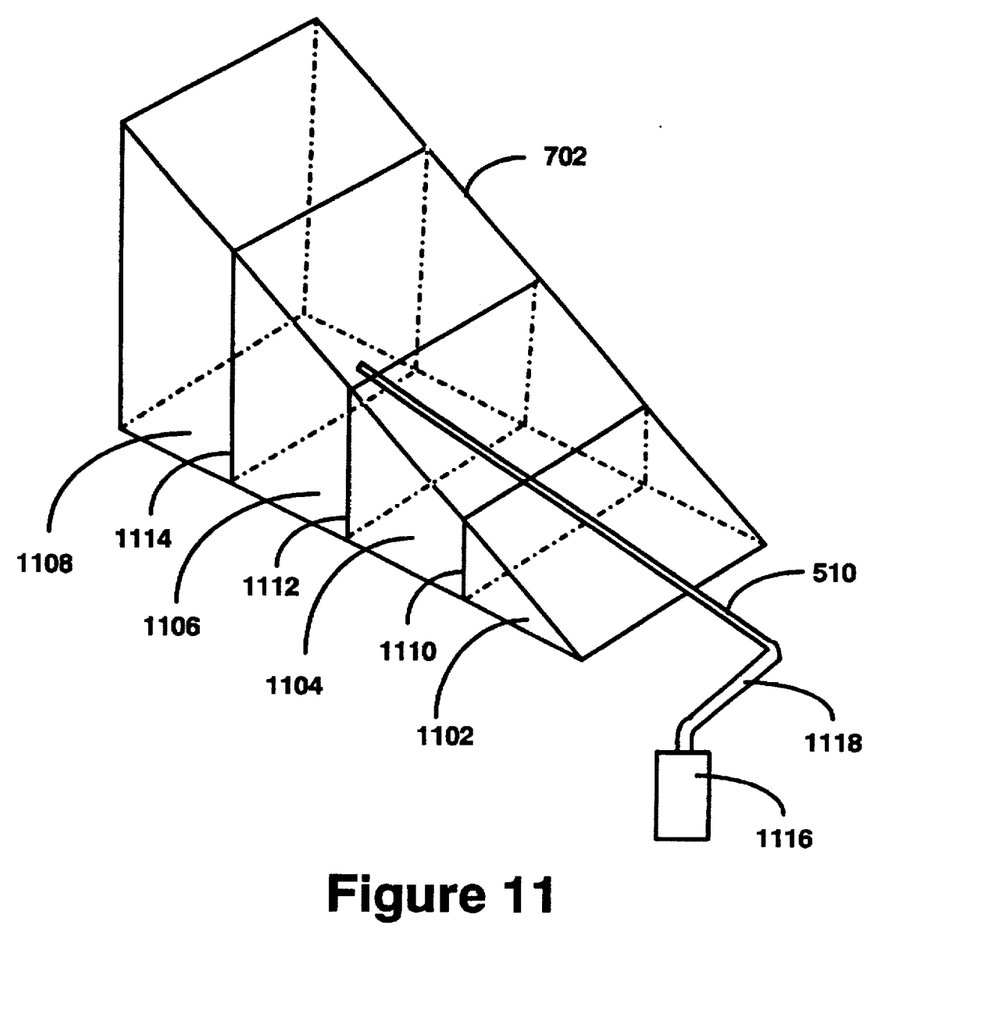
FIG. 11 is a diagram showing an alternative embodiment of the inflatable floor bed shown in FIG. 10.

FIG. 11 shows an alternative embodiment of inflatable floor bed 516. In this embodiment, each compartment 1102, 1104, 1106, 1108 has a single wall 1110, 1112, 1114 separating it from the adjacent compartment. Also shown in this embodiment is air pressure pump 1116 attached to fill line 510 via conduit 1118. Air pressure pumps are well known in the art and need no further explanation herein.

Figure 12:
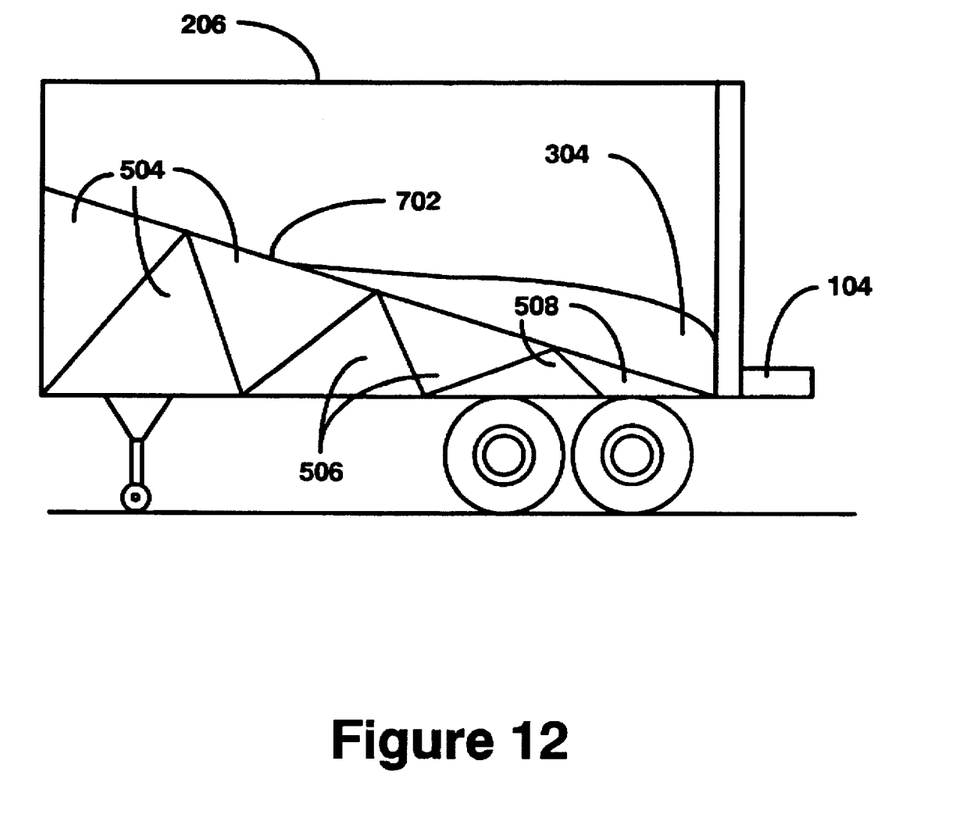
FIG. 12 shows the inflatable floor bed of FIGS. 6 through 9 used in a container without a liner.

FIG. 12 shows an alternative embodiment in which inflatable floor bed 516 is used with a container 206 which has no liner. A principle advantage of this invention is that integrated liner/inflatable floor bed systems can be manufactured, as well as independent inflatable floor beds 516. By using an independent inflatable floor bed 516, a standard liner can be used when warranted, as well as no liner at all.

Figure 13:
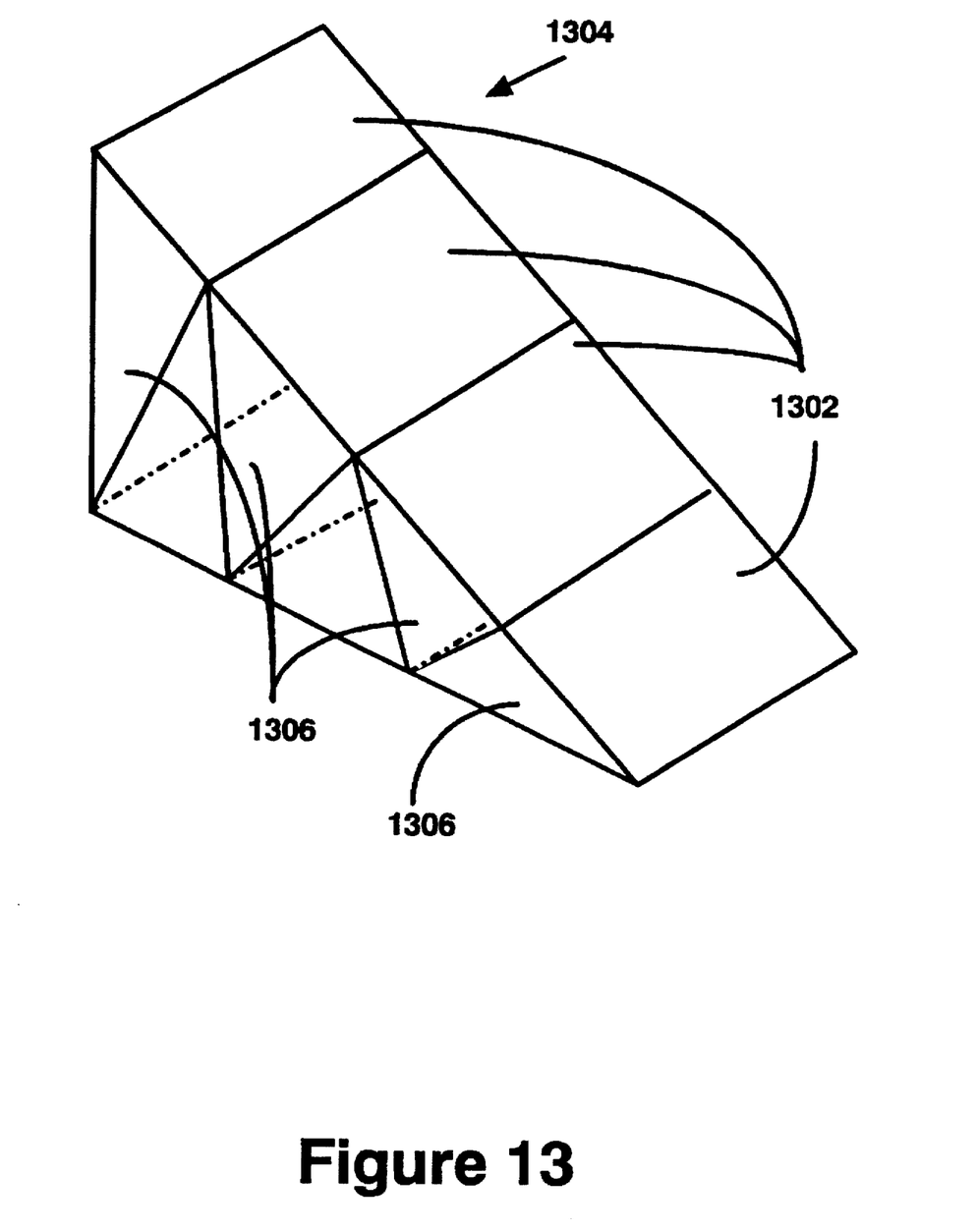
FIG. 13 is an alternative embodiment which uses rigid panels attached to the upper surface of the inflatable bag.

FIG. 13 illustrates an alternative embodiment of inflatable floor bed 516 which uses rigid panels on the upper surface of inflatable bag 1304. Inflatable bag 1304 may be used either as a stand-alone floor bed or as an integral part of a liner in the same manner as it was in the previous embodiments, discussed above. The advantage of using rigid panels is that they provide a more uniform surface area and semi-rigid or flexible panels.

In the preferred embodiment, each inflatable compartment 1306 has its upper surface attached to a rigid panel 1302. While a variety of rigid materials can be used to fabricate rigid panels 1302, such as such as plywood, fiberboard, plastic, gypsum board, metal, etc., the rigid panels 1302 in the preferred embodiment are constructed from common thermal sheathing used in home construction. Thermal sheathing can be obtained from a variety of sources. For example, Thermo-Ply (R) Sheathing produced by the Simplex Products Division of the Anthony Industries Company, available in one eighth inch thicknesses, has proven to be an effective rigid panel 1302.

The rigid panels 1302 can be attached to the upper surface of inflatable bag 1304 by a variety of methods such as adhesives, or by encasing the rigid panel 1302 between layers of upper surface material. Likewise, the rigid panel 1302 can be attached to either the inside or the outside surface of inflatable bag 1304.

Figure 14:
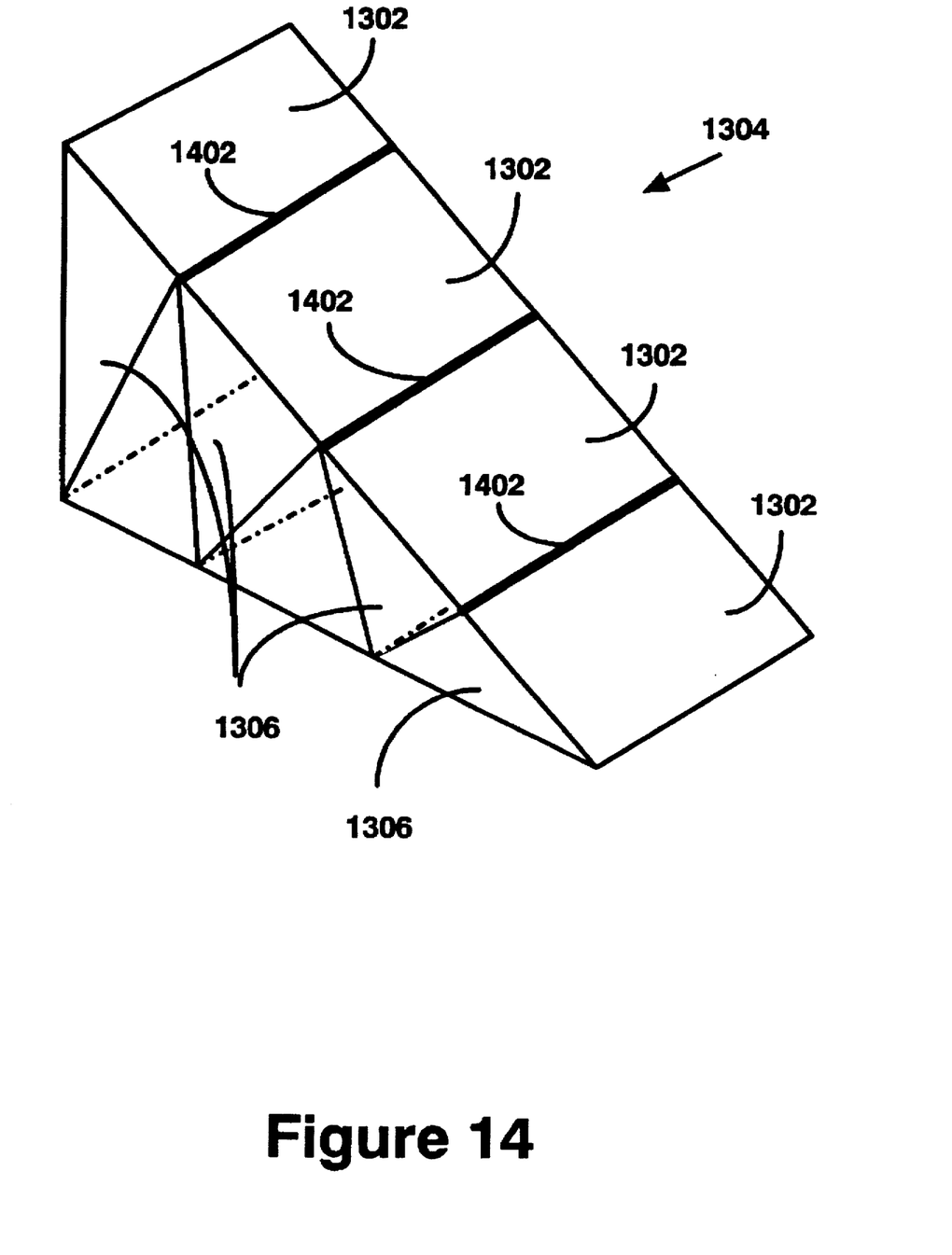
FIG. 14 is an alternative embodiment which uses rigid panels attached to the upper surface of the inflatable bag. The rigid panels are hinged to one another along their adjacent edges.

FIG. 14 illustrates another alternative embodiment in which the rigid panels 1302 are attached to one another by hinges 1402. Hinges 1402 can be conventional hinges made of metal, plastic, etc. However, in the preferred embodiment, they are flexible hinges made from an inexpensive material such as polyethylene, polypropylene, etc. By using these materials, the hinges 1402 can be made from the same material as the inflatable bags 1304. This allows easy attachment of the hinges 1402 by conventional methods such as heat sealing. Of course, if the material used to construct the inflatable bag 1304 is strong enough, then the hinges 1402 can be formed by the material in the inflatable bag 1304 which lies between the rigid panels 1302 and without requiring additional materials to construct the hinges 1402.

Figure 15:
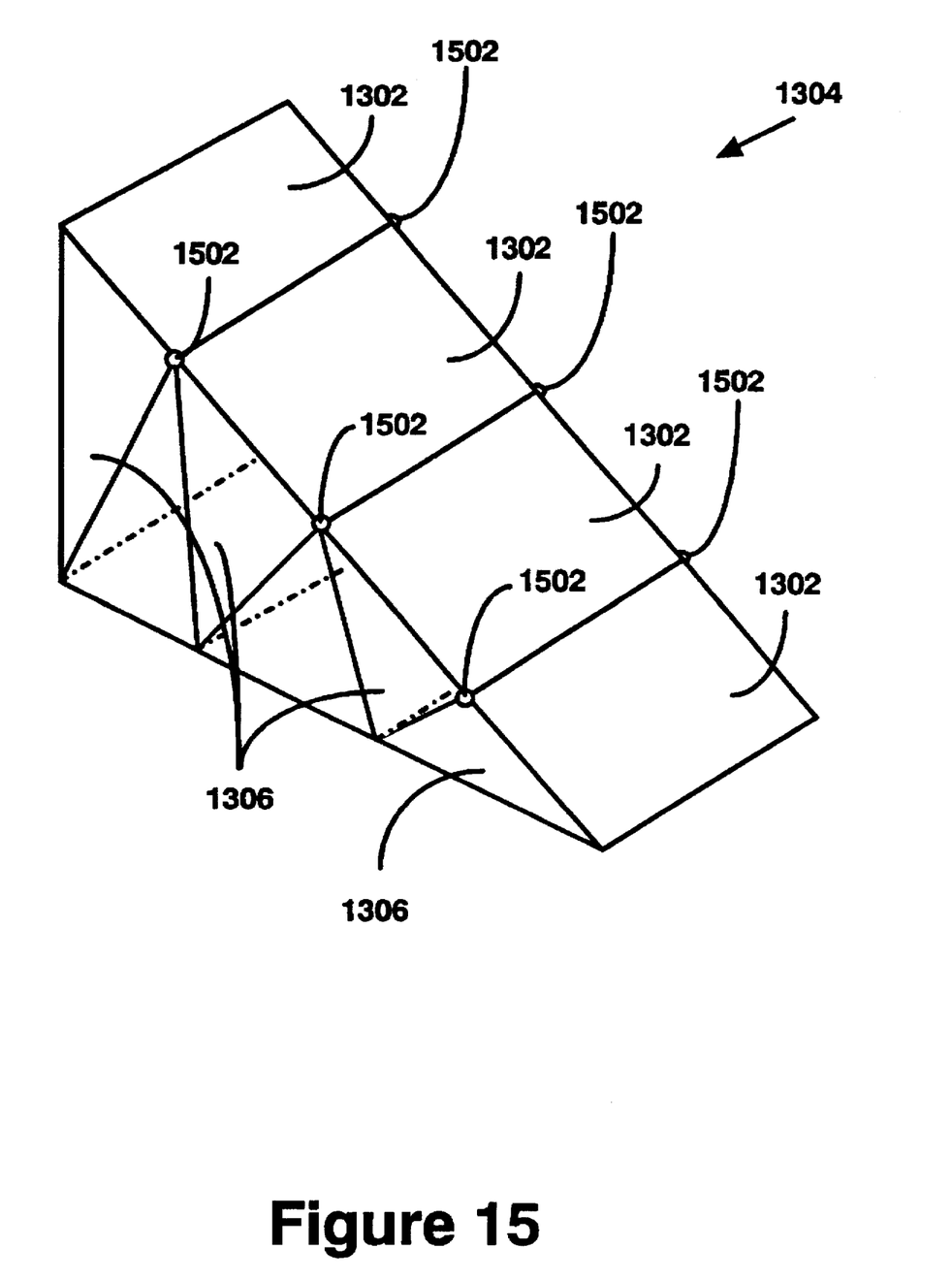
FIG. 15 is an alternative embodiment which uses rigid panels attached to the upper surface of the inflatable bag. The rigid panels are hinged to one another at the edges.

FIG. 15 illustrates another alternative embodiment in which the rigid panels 1302 are attached by edge mounted hinges 1502 attached at the edges of the rigid panels 1502. The edge mounted hinges 1502 can be easily installed by any convenient method such as clamping, bolting to the rigid panels 1302, etc. The only requirement is that inflatable bag 1304 must not be ruptured so that it cannot inflate.

While the invention has been described with respect to a preferred embodiment thereof, it will be understood by those skilled in the art that various changes in detail may be made therein without departing from the spirit, scope, and teaching of the invention. For example, the number and shape of compartments may vary, materials and thicknesses used to construct the inflatable floor bed may vary, the inflatable floor bed may be used with or without a liner, etc. Accordingly, the invention herein disclosed is to be limited only as specified in the following claims.

We claim:

1. An inflatable floor panel for use with a bulk cargo container having a floor area, side walls, a forward end and a rear end with a discharge door, comprising:

an inflatable bag, the inflatable bag having a flexible outer surface and having at least one pressurizable inner compartment, the inflatable bag having at least one air pressure line to accept input of pressurized air, and further having a size suitable to cover a substantial portion of the floor area of the container, the bag formed from flexible material such that when it is deflated it will compress into a substantially flat layer such that cargo can be loaded into the container and on top of the inflatable bag, the inflatable bag further divided into a plurality of inflatable compartments arranged in sequence from the forward end of the container to the rear end of the container;

the air input means attached to the inflatable bag air pressure line such that each compartment can be selectively inflated;

each compartment having an upper surface and further having a rigid support panel attached to the upper surface of the compartment such that when the compartment is inflated, the rigid support panel forms a substantially flat plane with a uniform flow angle, each rigid support panel attached to its respective compartment and aligned in close proximity with adjacent rigid support panels such that when the inflatable bag is inflated, the rigid support panels form a substantially continuous rigid surface; and the inflatable bag further shaped such that when the inflatable bag is inflated the upper surface forms a plane which slopes downward from the forward end of the container to a point substantially near the rear end of the container where the discharge door is located, the slope thus formed providing an increased slope angle for cargo flow which is greater than the natural flow angle for a particular cargo type.

2. An inflatable floor panel, as in claim 1, wherein the inflatable compartments are inflated in sequence beginning with the inflatable compartment nearest the discharge door at the rear of the container and progressing forward until the inflatable compartment at the forward end of the container farthest from the discharge door is inflated.

3. An inflatable floor panel, as in claim 2, wherein the rigid support panels are made from thermal sheathing.

4. An inflatable floor panel, as in claim 2, wherein the rigid support panels are made from plywood.

5. An inflatable floor panel, as in claim 2, wherein the rigid support panels are made from fiberboard.

6. An inflatable floor panel, as in claim 2, wherein the rigid support panels are made from plastic.

7. An inflatable floor panel, as in claim 2, further comprising at least one flexible hinge fabricated from flexible material, the flexible hinge attached to two adjoining rigid support panels such that the rigid support panels are held in substantial alignment.

8. An inflatable floor panel, as in claim 7, wherein the hinge is a flexible hinge formed by the flexible outer surface of the inflatable bag.

9. A liner for use with a bulk cargo container having a floor area, side walls, a forward end and a rear end with a discharge door, comprising:

a liner bag for holding cargo;

an inflatable bag attached to the floor of the liner bag on the outside or the inside of the liner bag, the inflatable bag formed such that at the interior of the inflatable bag has at least one pressurized inner compartment, the inflatable bag having air input means for input of pressurized air, and further having a size suitable to cover a substantial portion of the floor area of the liner, the bag formed from flexible material such that when it is deflated it will compress into a substantially flat layer such that cargo can be loaded into the liner and on top of the inflatable bag, the inflatable bag further divided into a plurality of inflatable compartments arranged in sequence from the forward end of the container to the rear end of the container;

each compartment having an upper surface and further having a rigid support panel attached to the upper surface of the compartment such that when the compartment is inflated, it forms a substantially flat plane, each rigid support panel attached to its respective compartment and aligned in close proximity with adjacent rigid support panels such that when the inflatable bag is inflated, the rigid support panels form a substantially continuous rigid surface with a uniform flow angle;

the air input means attached to each compartment of the inflatable bag such that each compartment can be selectively inflated; and the inflatable bag further shaped such that when the inflatable bag is inflated the upper surface slopes downward from the forward end of the container to a point substantially near the rear end of the container where the discharge door is located, the slope thus formed providing a slope angle which is greater than the natural flow angle for cargo in the liner.

10. A liner, as in claim 9, wherein the inflatable compartments are inflated in sequence beginning with the inflatable compartment nearest the discharge door at the rear end of the container and progressing forward until the inflatable compartment at the forward end of the container farthest from the discharge door is inflated.

11. An inflatable floor panel, as in claim 10, wherein the rigid support panels are made from thermal sheathing.

12. An inflatable floor panel, as in claim 10, wherein the rigid support panels are made from plywood.

13. An inflatable floor panel, as in claim 10, wherein the rigid support panels are made from fiberboard.

14. An inflatable floor panel, as in claim 10, wherein the rigid support panels are made from plastic.

15. An inflatable floor panel, as in claim 10, further comprising at least one flexible hinge fabricated from flexible material, the hinge attached to two adjoining rigid support panels such that the rigid support panels are held in substantial alignment.

16. An inflatable floor panel, as in claim 15, wherein the hinge is a flexible hinge formed by the flexible outer surface of the inflatable bag.

17. A method of enhancing cargo flow in a bulk cargo container having a floor area, side walls, a forward end and a rear end with a discharge door with an inflatable bag, including the steps of:

installing the inflatable bag in the container prior to loading cargo, the inflatable bag having a size suitable to cover a substantial portion of the floor area of the container, the bag formed from flexible material such that when it is deflated it will compress into a substantially flat layer such that cargo can be loaded into the container and on top of the inflatable bag;

dividing the inflatable bag into a plurality of inflatable compartments arranged in sequence from the forward end of the container to the rear end of the container;

shaping the inflatable bag such that it has an upper surface and when the inflatable bag is inflated the upper surface forms an upper plane which slopes downward from the end of the container farthest from the discharge door to a point substantially near the end of the container where the discharge door is located, the slope thus formed providing an increased slope angle for cargo flow which is greater than the natural flow angle;

attaching a rigid support panel to the upper surface of each compartment such that when the compartment is inflated, the rigid support panel forms a substantially flat plane with a uniform flow angle, and attaching each rigid support panel to its respective compartment and aligning it in close proximity with adjacent rigid support panels such that when the inflatable bag is inflated, the rigid support panels form a substantially continuous rigid surface;

raising the upper surface of the inflatable bag at an angle during unloading by pumping air into the inflatable bag of cargo; and selectably inflating each compartment to adjust the slope of the inflatable bag in predetermined areas of the inflatable bag.

18. A method, as in claim 17, wherein the rigid support panels are held in alignment by hinges mounted between adjoining rigid support panels.

* * * * *